United States Patent [19]

Lang et al.

[11] 4,438,679

[45] Mar. 27, 1984

[54] AXIAL THRUST COMPENSATING MEANS FOR POWER STEERING CONTROL VALVE

[75] Inventors: Armin Lang, Schwäbisch Gmünd; Helmut Knödler, Lorch, both of Fed. Rep. of Germany

[73] Assignee: Zahnradfabrik Friedrichshafen, AG, Friedrichshafen, Fed. Rep. of Germany

[21] Appl. No.: 414,575

[22] Filed: Sep. 2, 1982

[30] Foreign Application Priority Data

Sep. 19, 1981 [DE] Fed. Rep. of Germany ....... 3137366

[51] Int. Cl.³ .............................................. F15B 9/02
[52] U.S. Cl. .................................. 91/370; 91/375 R; 91/380; 91/465; 91/467
[58] Field of Search ................. 91/370, 371, 372, 373, 91/375 R, 380, 465, 467; 180/146, 147

[56] References Cited

U.S. PATENT DOCUMENTS

| 3,022,772 | 2/1962 | Zeigler et al. | 91/375 A |
| 3,772,962 | 11/1973 | Suzuki | 91/375 A |
| 3,855,904 | 12/1974 | Jablonsky | 91/372 |

*Primary Examiner*—Robert E. Garrett
*Assistant Examiner*—Timothy E. Nauman
*Attorney, Agent, or Firm*—Zalkind & Shuster

[57] ABSTRACT

An auxiliary fluid power steering device having a servomotor (8) and a control valve (13) in a common steering gear housing (1). In order to relieve the control valve of axial pressure forces, the valve body (14) of the control valve has four surfaces (24, 25, 26, 27) of equal area respectively exposed exclusively to fluid in the inlet port (22), in the outlet port (23), in one of the servomotor pressure chambers (9) adjacent the control valve and in the other pressure chamber (10) of the servomotor.

4 Claims, 1 Drawing Figure

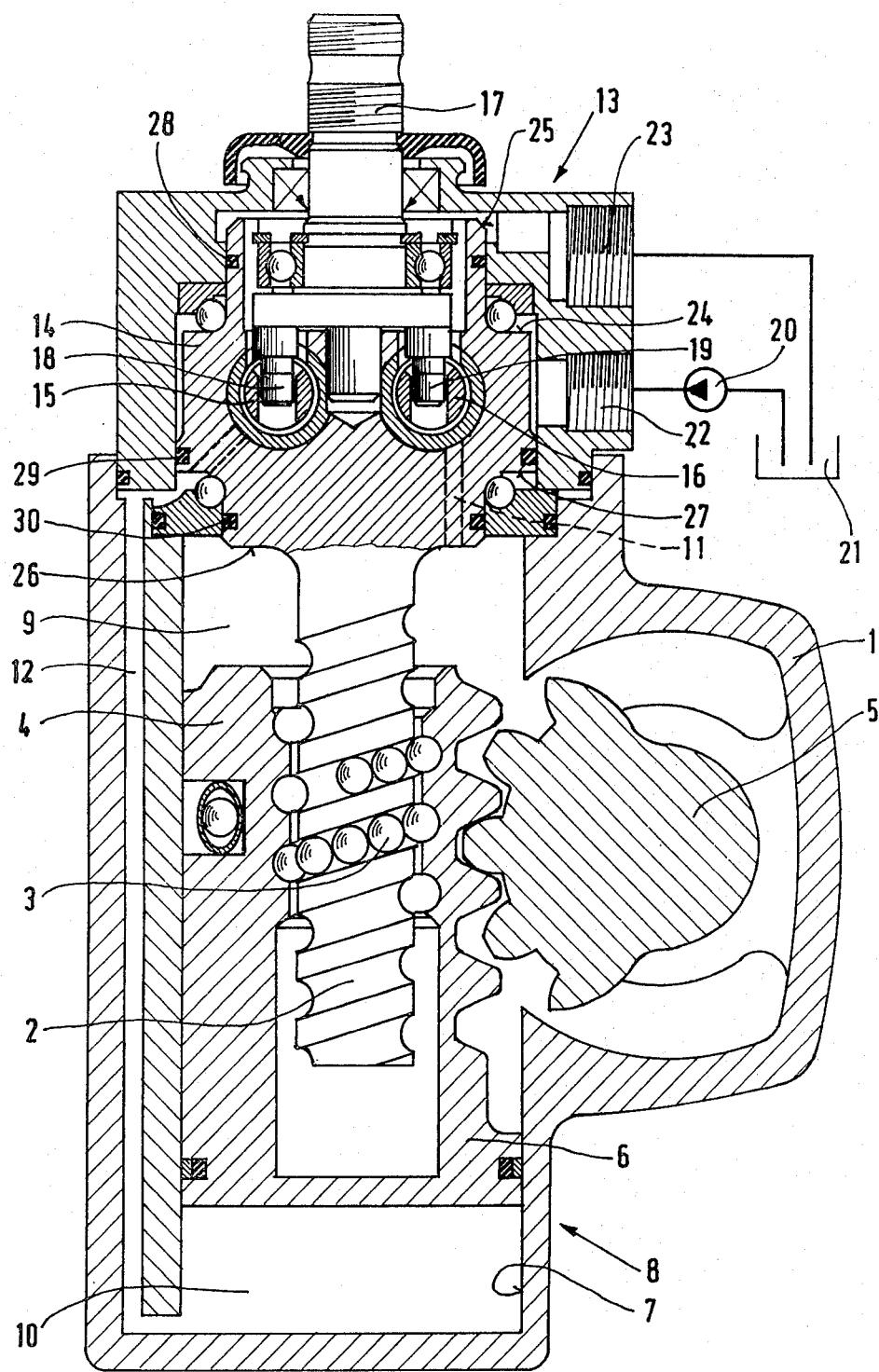

AXIAL THRUST COMPENSATING MEANS FOR POWER STEERING CONTROL VALVE

BACKGROUND OF THE INVENTION

This invention relates to a fluid power, servo-steering mechanism of the type having a common housing for the steering control valve, the servomotor and steering gear.

Auxiliary fluid power steering devices of the foregoing type are known from the German Patent Specification 19 24 032. In such devices the rotary valve body of the control valve has a large external portion thereof enclosed by fluid chambers under return pressure. A portion of one of the faces of the valve body from which the steering worm extends is exposed to one of the pressure chambers of the servomotor. Since the pressure on such face of the control valve is not compensated for, a high axial thrust corresponding to the high operating pressure in the servomotor is exerted on the control valve to correspondingly load axial bearings that must be designed to cope with such thrust. The axial thrust occurs however only when the pressure chamber of the servomotor adjacent to the control valve is acted upon by fluid under operating pressure in one direction of steering so that repetitive stress loading of the control valve results. Although axial thrust is somewhat reduced by sealing and stress relieving means associated with prior art auxiliary steering gear, the problem is not completely solved.

It is therefore an important object of the present invention to improve auxiliary steering gear of the foregoing type in such a way that the control valve is completely relieved of axial pressure forces without additional cost.

SUMMARY OF THE INVENTION

In accordance with the present invention, the rotatable valve body of the steering control valve is provided with four operative surfaces of equal area compensating each other under all operating conditions. In the neutral position of the control valve, all the surfaces are acted upon by the flow pressure. In the two steering positions, mutually opposing surfaces are exposed either to fluid under operating pressure or return pressure.

BRIEF DESCRIPTION OF DRAWING FIGURES

The invention is described in detail in the following with reference to an embodiment shown in the drawing. The single FIGURE shows a longitudinal section through the steering device of the invention.

DETAILED DESCRIPTION OF PREFERRED EMBODIMENT

An auxiliary steering gear assembly is shown comprising a housing 1 rotatably mounting a steering worm 2, a steering nut 4 operatively engaged through a ball chain 3 with the steering worm and a steering shaft 5 having a sector gear enmeshed with rack teeth on the nut 4. A pressure piston 6 is formed on the steering nut 4 to form a servomotor 8 together with a cylindrically shaped chamber portion 7 of the steering gear housing 1. The pressure piston 6 separates two pressure chambers 9 and 10 from one another in the pressure cylinder portion 7.

The two pressure chambers 9 and 10 are connected via pressure conduits 11 and 12 with a control valve 13 associated with the steering gear housing 1. The control valve 13 includes two control valve pistons 15 and 16 mounted in a valve body 14 for displacement. The valve pistons 15 and 16 may be displaced by two actuating pins 18 and 19 connected to a steering spindle 17. The valve pistons 15 and 16 and the valve housing 14 are provided in a known manner disclosed for example in German Patent Specification 11 33 642, with fluid control passages. The valve body 14 is rigidly connected to the steering worm 2 and is rotatably mounted in the steering gear housing.

The control valve distrbutes the pressure medium supplied thereto at an inlet port 22 by a servo-pump 20 from a reservoir 21, to the two chambers 9 and 10 of the servomotor 8. The pressure medium from the control valve 13 is returned to the reservoir 21 through an outlet port 23 on the steering gear housing.

The valve body 14 of the control valve 13 has four axial surfaces 24, 25, 26 and 27 which may be acted upon by pressures of varying levels. These four surfaces are equal in area. The annular surface 24 faces away from the servomotor and is exclusively exposed to fluid in the inlet port 22 between a radially inner rotating seal 28 on the valve body and a radially outer rotating seal 29. The circular surface 25 facing in the same direction as surface 24 is exclusively exposed to fluid in the outlet port 23 on one axial side of a radially inner rotating seal 28. The circular surface 26 bordering and facing the servomotor is exclusively exposed to the fluid in pressure chamber 9 of the servomotor 8 through which the steering worm 2 extends in one axial direction from the control valve. The annular surface 27 also facing the servomotor is exclusively exposed to fluid in the other pressure chamber 10 of the servomotor 8 via the pressure conduit 12 and is defined as an annular face between the outer rotating seal 29 and a radially inner rotating seal 30 on the valve body.

In the neutral position of the control valve 13 all four surfaces 24 to 27 are exposed to the fluid flowing under pressure from the servo-pump 20 to the reservoir 21 for those embodiments of the control valve having a flow circulating neutral position. The control valve is thereby pressure compensated in the direction of movement. In one steering direction in which the pressure chamber 9 is acted on by operating pressure, the operating pressure acts on the surfaces 26 and 24, while the surfaces 25 and 27 are exposed to fluid under return pressure. Since the surfaces are of the same size, the control valve 13 is not subject to uncompensated, axial pressure forces in the latter operating mode. In the steering direction in which the pressure chamber 10 is supplied with pressure medium at operating pressure, the two annular surfaces 24 and 27 are acted upon by operating pressures having the same level, while the two circular surfaces 25 and 26 are exposed to fluid under the return pressure. The control valve 13 is then also free of uncompensated axial pressure forces.

What is claimed is:

1. In an auxiliary power steering assembly including a housing mounting a steering gear and enclosing a servomotor (8) operatively connected to the steering gear and having separated pressure chambers (9, 10), a steering spindle, a reservoir of pressure medium, a servopump, and a control valve (13) operatively interconnecting the spindle with the servomotor through which the pressure medium is distributed to the pressure chambers to actuate the servomotor, said control valve having an inlet port (22) to which the pressure medium from the servopump is conducted, an outlet port (23) from which the pressure medium is conducted to the reservoir under a return pressure, and a valve body (14) through which the pressure medium is conducted between said ports and the servomotor, the improvement residing in axial thrust compensating means for the control valve comprising four operative surfaces (24, 25, 26 and 27) of equal area formed on the valve body, a first of said surfaces (24) being exclusively exposed to the pressure medium in the inlet port, a second of the surfaces (25) being exclusively exposed to the pressure medium in the outlet port, a third of the surfaces (26) being exclusively exposed to the pressure medium in one of the pressure chambers (9) bordering the control valve, and the fourth of the surfaces (27) being exclusively exposed to the pressure medium in the order of the pressure chambers (10), said first and second of the surfaces (24 and 25) facing away from the servomotor while said third and fourth of the surfaces (26 and 27) face the servomotor.

2. The improvement as defined in claim 1, wherein the second and third of the surfaces (25 and 26) are circular in shape, a pair of radially inner seals (28 and 30) mounted on the valve body limiting exposure of the second and third of the surfaces to the pressure medium respectively in the outlet port (23) and in said one of the pressure chambers (9), the first and fourth of the surfaces (24 and 27) being annular in shape, and a radially outer seal (29) mounted on the valve body and cooperating with the radially inner seal to limit exposure of the first and fourth of the surfaces to the pressure medium respectively in the inlet port (2w) and in the other of the pressure chambers (10).

3. The improvement as defined in claim 2, including first conduit means (11) in the valve body for establishing fluid communication between said one of the chambers (9) and the control valve (13), an annular chamber to which the fourth of the surfaces (27) is exposed being formed between the radially outer seal (29) and one of the radially inner seals (30), and second conduit means (12) in the housing for establishing fluid communication between said annular chamber and the other of the pressure chambers (10).

4. In a fluid power steering assembly including a housing enclosing a servomotor (8) having separated pressure chambers (9, 10), and a control valve (13) having inlet and outlet ports (22 and 23) through which pressure medium is conducted and a valve body (14) formed with passages through which the pressure medium is conducted between said ports and the servomotor, the improvement residing in axial thrust compensating means for the control valve comprising two opposing pairs of surfaces (24, 25, 26, 27) of equal area formed on the valve body, a first of said pairs of the surfaces (24 and 25) being respectively exposed to the pressure medium in the inlet and outlet ports, and the second of said pairs of the surfaces (26 and 27) being respectively exposed to the pressure medium in the pressure chambers (9 and 10).

* * * * *